April 24, 1934.  R. MOUREAUX  1,956,329
APPARATUS FOR CLEANING AND STRIPPING GRAIN
Filed Dec. 5, 1930   3 Sheets-Sheet 1
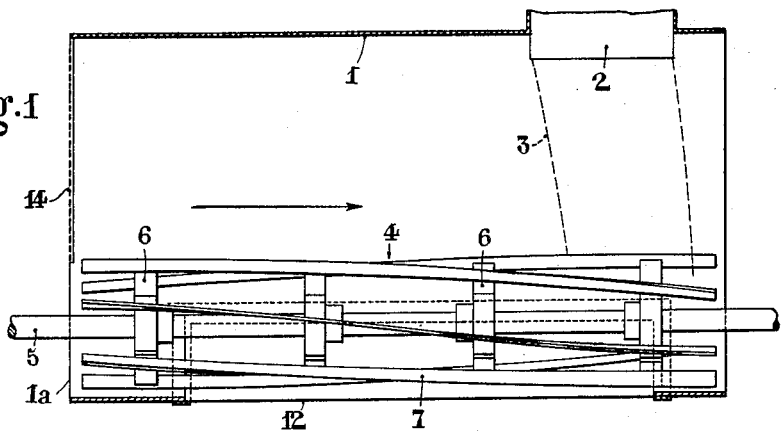
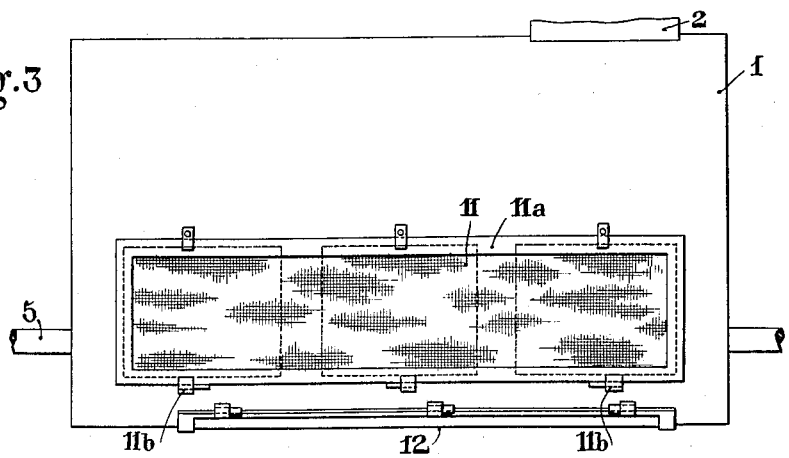
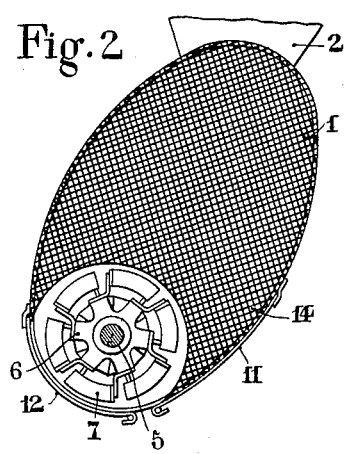
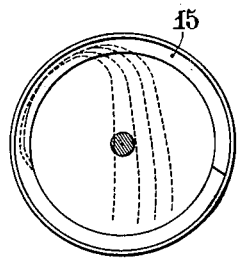

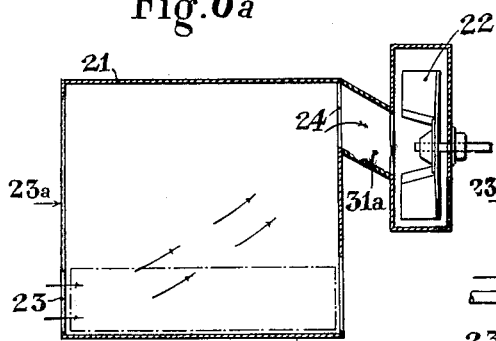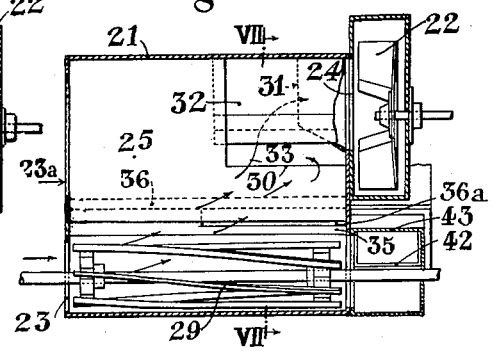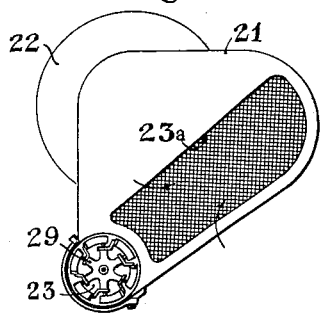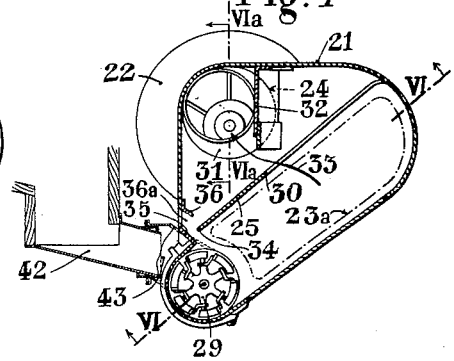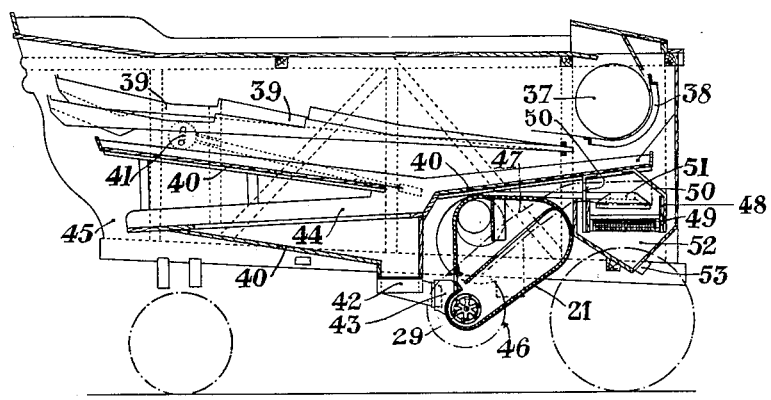

April 24, 1934.   R. MOUREAUX   1,956,329
APPARATUS FOR CLEANING AND STRIPPING GRAIN
Filed Dec. 5, 1930   3 Sheets-Sheet 3

Patented Apr. 24, 1934

1,956,329

UNITED STATES PATENT OFFICE 1,956,329

APPARATUS FOR CLEANING AND STRIPPING GRAIN

René Moureaux, Vierzon, France, assignor to Société de Construction Mécanique de Vierzon, (anciens Etablissements Brouhot & Cie), Vierzon, France Application December 5, 1930, Serial No. 500,366
In France April 19, 1930

3 Claims. (Cl. 209—153)

This invention has for object improvements in apparatus for cleaning and stripping grain.

According to the invention, these operations are effected within a horizontal or slightly inclined drum by the double action of an air stream adapted to drive away the impurities and of a device intended, on the one hand, to project the material to be cleaned so that it falls back from the top of the drum through the relatively large empty space of the latter and, on the other hand, to feed the grain towards the outlet located at one end of the drum.

This arrangement allows to obtain a progressive cleaning of the thrashed grain at the same time as stripping if it is necessary.

This apparatus can treat the material which falls through the short straw panel of thrashing machines, after shaking of the straw and elimination of short straw by this panel. However, the apparatus could also receive the material which falls under the straw-shakers of thrashing machines, and clean the grain by eliminating the short straw at the same time as all other impurities.

The accompanying drawings illustrate, by way of example only, apparatus constructed according to the present invention.

Fig. 1 is a longitudinal section,

Fig. 2 an end elevation and

Fig. 3 a side view of carrying out the subject-matter of the invention.

Fig. 4 illustrates in end view a second form of construction.

Figs. 5, 6, and 7 illustrate a modification.

Fig. 5 is an end view.

Fig. 6 is a section made along line VI—VI of Fig. 7.

Fig. 6a is a section according to line VIa—VIa of Fig. 7.

Fig. 7 is a cross-section made according to line VII—VII of Fig. 6.

Fig. 8 is a general diagrammatic view of a thrashing machine provided with this cleaning apparatus.

Figure 10:
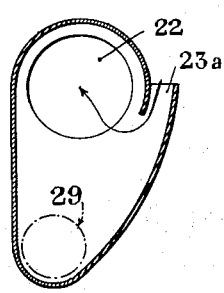
Figs. 10, 11 and 12 illustrate other forms of construction.

Referring to Figs. 1 to 3, 1 designates a sheet metal drum or cylinder, the straight section of which has preferably the general shape of an ellipsis, the large axis of which is preferably inclined as indicated in Fig. 2; the axis of the cylinder is horizontal or slightly inclined in one direction or the other.

In this drum circulates, from the left towards the right of the figure, a suitable air stream, as indicated by the arrow, this air stream being produced either by suction, or by delivery, by means of a fan (not shown).

The material falls in sheet form from a hopper 2 arranged in the upper part of the drum at such a distance from the right-hand end of the latter that the grain subjected to the action of the air stream falls on the lower part of the drum according to the path 3 indicated in dotted lines, that is to say, to the left of the right-hand end of the drum.

4 designates a projecting and propelling apparatus composed of a shaft 5, rotating at a certain speed, on which are mounted spiders 6 carrying narrow blades 7 arranged in an helix of long pitch, the distance separating these blades from the shaft being adjustable.

This apparatus serves both to feed the grain towards the left of the figure and to project the entire material to be treated against the walls of the drum, so as to produce a continuous shower of this material, which shower is moreover beaten in all directions. The material being thus projected in the form of a continuous shower, is divided under the action of the air stream: the grain moves towards the left and the impurities of all nature are carried along by the air stream towards the right. Certain impurities larger than the grain and of relatively great density (thistle or poppy heads, etc.) issue with the grain and are eliminated by sifting.

The shaft 5 preferably passes through the centre of the osculatory circle at the apex of the large axis of the section of the cylinder. A suitable space, which can moreover be adjusted by varying the distance separating the blades from the shaft, is provided between the rotating apparatus and the wall of the drum.

The lower part of the drum is constituted of a certain length by a dust-grate 11 allowing to evacuate to the exterior the heavy dust and the small seeds, this grate being arranged in the zone where the maximum quantity of the projected material falls back. This grate is mounted in a frame 11a provided with hinges 11b, this allowing to have ready access to the rotating apparatus.

For stripping the grain at will, a removable panel 12 is provided in the drum; this panel can be made either of smooth solid sheet metal when it is not desired to strip the grain, or it can be provided with a point-removing gauze, or again with strips on its inner wall. The said panel is secured to the lower part of the drum where the space between the wall of the drum and the rotating apparatus has a constant width.

A particular arrangement of the apparatus would consist in utilizing the fan, in case of suction, for delivering the impurities to the exterior. Another solution, which may co-exist with the preceding one, consists in mounting the rotating apparatus on the same shaft as the suction or delivery fan.

The grain is collected at 1$^a$ at the outlet of the drum and at the lower part. A sieve 14 can be arranged in the outlet section of the drum so as to prevent the projections of grain to the exterior. Moreover, the blades of the rotating apparatus can end at a certain distance from the drum outlet.

For eliminating heavy impurities, such as thistle or poppy heads, etc., the grain is caused to enter a horizontal drum (not shown) lined with a suitable grate and rotating at a low speed, or on a plane and slightly inclined grate receiving a reciprocating horizontal movement, or in a sorting apparatus.

According to a second form of carrying out the subject-matter of the invention, the air stream is caused to pass in a cylindrical drum having a circular section, shown in Fig. 4 and rotating at such a speed that the material to be cleaned which is introduced therein falls back in the form of a shower towards the top of the drum according to the path shown in dotted lines in Fig. 4. A helical rib 15, secured on the inner wall of this drum, causes the grain to move forward. For effecting the stripping, an ordinary cutter stripper (not shown), or an apparatus similar to the rotating apparatus above described, may be caused to rotate concentrically or not with this drum which is provided with a point-removing gauze (not shown).

The apparatus illustrated in Figs. 5 to 7 comprises a sheet metal drum 21, the straight section of which has the shape of a curvilinear triangle; the axis of this drum is horizontal.

In this drum circulates, from the left towards the right, an air stream produced by a turbine 22; the sucked air is admitted through the orifice 23 and issues through the orifice 24.

The materials to be cleaned which are supplied, through a conduit 42, to the bottom of the drum 21, are thrown upwardly by a projecting device 29, and a sheet metal plate 25 directs their trajectory. This sheet metal plate 25 rises up to 30 (Fig. 7) on one half only of the length of the apparatus (Fig. 6), and, on the other half, it extends to the upper wall to which it is connected, thus forming a passage on the side the air stream is admitted. A funnel 31, secured on the opening 24 of the turbine 22, serves, on the one hand, to reduce the suction opening and, on the other hand, to cause the air stream to follow an oblique direction at the entrance of this funnel. This funnel can be replaced by an oblique adduction tube 31$^a$, as shown in Fig. 6$a$. A vertical sheet metal plate 32, tangent to the funnel (Fig. 7), extends a little farther than the open part of the sheet metal plate 25 (see Fig. 6).

This sheet metal plate serves to prevent rebounding of grain opposite the suction opening and, on the other hand, to direct the air stream so as to produce on one half of the apparatus a distinctly transverse suction directed according to the arrow 33 (Fig. 7).

A two-phase cleaning action is thus obtained. On the first half of the apparatus (along the sheet metal plate 32), the transverse suction lifts the husk and light impurities, and on the second half of the apparatus, in the passage formed by the sheet metal plate 25 and by the lower part of the casing 21, that is to say the dust-grate, where the air stream is much more violent, it drives away the impurities such as small straw and the like.

The space left free between the opening 24 and the projecting device 29, that is to say in practice between the funnel 31 and the sheet metal plate 25, has a sufficient depth in order that the air stream produced in the passage formed by the sheet metal plate 32, the sheet metal plate 25 and the vertical wall of the apparatus, should not be too violent and should not cause the rising of the grain which rebounds above the sheet metal plate 25.

The sheet metal plate 25 terminates at the bottom at 34 at a certain distance from an inclined sheet metal plate 35 surmounted by another inclined sheet metal plate 36; the interval between the sheet metal plate 25, on the one hand, and the sheet metal plates 35, 36, on the other hand, forms a baffled passage allowing the grain rolling on the sheet metal plate 36 to enter the projecting device 29 and permitting upward passage of the air which serves to lift the straw or other impurities in order to prevent the bottom of the apparatus being clogged at this place. An aperture 36$^a$ is provided in the side wall of the apparatus, between the sheet metal plates 35 and 36, on a certain length from the vertical wall adjacent to the turbine in order to allow the passage of an air stream preventing clogging in of the apparatus in this region.

Fig. 8 shows a thrashing machine equipped with this apparatus and provided, as most of the thrashing machines used heretofore, with a thrasher 37, a counter-thrasher 38, shakers 39, and a vibrating table 40 which is actuated for instance by two eccentrics arranged outside the thrashing machine and each rigidly secured on one end of the shaft of the shakers 41.

This table has but a small stroke and the number of its oscillations per minute is equal to the number of revolutions of the shaft of the shakers 41 during the same time. The slopes of this table are more inclined than in standard thrashing machines for remedying to the reduction of the effects of inertia of this table and ensuring nevertheless the flow of the materials; these materials are collected in a conduit 42 which discharges them in a spout 43 adjoining the cleaning apparatus. It is to be understood that the table is provided, as usual, with a short straw panel 44 for ensuring evacuation of short straw at 45.

On the same shaft as the projecting device 29 of the cleaning apparatus above described, is mounted an elevator 46 projecting, through its conduit 47, the cleaned grain into a grain bin 48 and allowing it to fall in the form of a shower on a grate 49, of great width and the length of which is equal to the entire internal width of the thrashing machine. This grate 49 is mounted in a box hung, by iron fittings 50, from the table 40 and, consequently, receiving the same movement. The said grate is inclined for ensuring evacuation of the grain on the side opposite to its entrance, and it is divided into several parts (usually in three parts) the holes of which have different widths: the first part, arranged near the inlet, is a grate for small residue; the second part, arranged at the middle, is a grate for medium size grain, and the third part, arranged on the side opposite to the inlet, is a grate for large size grain.

Figure 9:
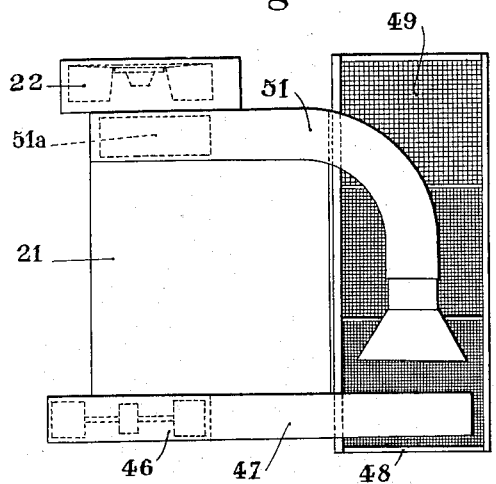
Fig. 9 is a plan view of a detail of this diagrammatic view.

This grate evacuates to the exterior, on the side opposite to the inlet, through a slot (not shown) provided in the wall of the thrashing machine, the thistle heads, small straw and all other impurities too large for passing with the grain; a supplementary cleaning is effected upon arrival of the grain by means of a conduit 51 opening in front of the grain shower falling from the box 48 on to the grate 49 (see Fig. 9). This conduit is connected at 51$^a$ to the turbine 22, so that the residual impurities of the grain issuing from the conduit 47 are sucked through this conduit 51 and the turbine. It is to be noted that in these conditions, the impurities do not return to the thrasher as in the case of husk aspirators provided in ordinary thrashing machines. In fact, it is because in the present case, the rotating apparatus 29 and if need be stripping plates arranged on the casing 21 about the apparatus 29 disintegrate the husk; it is therefore unnecessary to provide a husk aspirator returning the husk to the thrasher.

Under the sorting grate 49 is arranged a bagging box 52 provided with compartments and spouts 53 corresponding to the various groups of perforations of the sorting grate.

Figure 11:
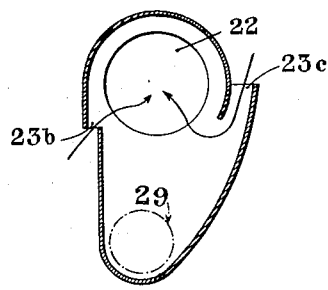
Figure 12:
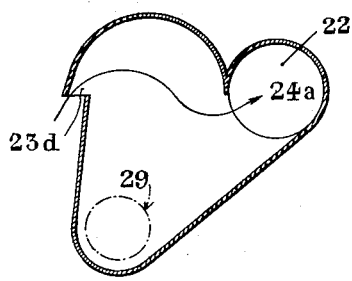

Figs. 10 and 11 diagrammatically illustrate two forms of construction of the cleaning apparatus according to the invention, in which the air sucked by the turbine is admitted through an opening 23$^a$ or two transverse openings 23$^b$—23$^c$. In this case, the sides of the apparatus are closed, Fig. 12 shows a form of construction in which the air is admitted through a transverse opening 23$^d$ and issues through another side opening 24$^a$ connected to the turbine, by passing through the zone of projection of the material to be cleaned.

I claim:

1. Apparatus for cleaning grain comprising a case of triangular section with rounded corners, an oblique wall in the said case, almost parallel to one of the walls of the latter, a rotary device disposed in the lower corner of the case and adapted to throw the grain in the upward direction along the lower face of the said oblique wall, the said chamber having an inlet for the grain at one of its ends, an outlet for the grain at the other end, an air inlet at this latter end, below the said oblique wall, an air outlet at the first end, above this wall, means for sucking air at the said air outlet, and a wall extending downwards from the top of the case, between the said oblique wall and the air outlet, these two walls providing between them a narrow interval for allowing an air stream to pass across the upper edge of the oblique wall.

2. Apparatus for cleaning grain comprising a case of triangular section with rounded corners, an oblique wall in the said case, almost parallel to one of the walls of the latter, a rotary device disposed in the lower corner of the case and adapted to throw the grain in the upward direction along the lower face of the said oblique wall, the said chamber having an inlet for the grain at one of its ends, an outlet for the grain at the other end, an air inlet at this latter end, below the said oblique wall, an air outlet at the first end, above this wall, means for sucking air at the said air outlet, and a wall extending downwards from the top of the case, between the said oblique wall and the air outlet, these two walls providing between them a narrow interval for allowing an air stream to pass across the upper edge of this oblique wall, the oblique wall having a narrow opening at its lower part, on the side where the grain enters.

3. Apparatus for cleaning and stripping grain and similar materials, comprising a horizontal box having a cross section in the shape of a triangle with rounded angles, one side of which is substantially vertical and the upper side of which is substantially horizontal, means for sucking air in this box at one of its ends, at the top, near its vertical wall, a rotary device having a horizontal axis placed in the lower angle of the box and adapted to project materials upwardly into the said box, an inclined wall in this box above the said device, this wall having a recess in its upper part on the side of the suction means, and a vertical wall extending downwardly from the upper side of the box opposite the said recess, the said box having an opening for the introduction of the materials to be cleaned, an opening for the issue of the cleaned material, this latter opening being provided at the bottom, on the side opposite to the said suction means, and an opening for the admission of air in the box, this opening being provided in the same side above the said outlet opening and below the said inclined wall.

RENÉ MOUREAUX.